US010198831B2

(12) United States Patent
Bhuruth

(10) Patent No.: US 10,198,831 B2
(45) Date of Patent: Feb. 5, 2019

(54) METHOD, APPARATUS AND SYSTEM FOR RENDERING VIRTUAL CONTENT

(71) Applicant: CANON KABUSHIKI KAISHA, Tokyo (JP)

(72) Inventor: Berty Jacques Alain Bhuruth, New South Wales (AU)

(73) Assignee: Canon Kabushiki Kaisha, Tokyo (JP)

(*) Notice: Subject to any disclaimer, the term of this patent is extended or adjusted under 35 U.S.C. 154(b) by 4 days.

(21) Appl. No.: 14/704,639

(22) Filed: May 5, 2015

(65) Prior Publication Data

US 2015/0325051 A1 Nov. 12, 2015

(30) Foreign Application Priority Data

May 8, 2014 (AU) .................................. 2014202500

(51) Int. Cl.
*G06T 11/00* (2006.01)
*G06T 19/00* (2011.01)

(52) U.S. Cl.
CPC ............ *G06T 11/00* (2013.01); *G06T 19/006* (2013.01)

(58) Field of Classification Search
None
See application file for complete search history.

(56) References Cited

U.S. PATENT DOCUMENTS 8,218,766 B2 7/2012 Sahai
8,462,153 B2 * 6/2013 Repin ..................... G06T 19/00
345/420

(Continued)

OTHER PUBLICATIONS

Butz et al., "Of Vampire Mirrors and Privacy Lamps: Privacy Management in Multi-User Augmented Environments." Proceedings of the 11th annual ACM symposium on User interface software and technology. ACM, 1998, pp. 1-2.

Bullock et al. "An access control framework for multi-user collaborative environments." Proceedings of the international ACM SIGGROUP conference on Supporting group work. ACM, 1999, pp. 1-10.

*Primary Examiner* — Kee M Tung
*Assistant Examiner* — Yanna Wu
(74) *Attorney, Agent, or Firm* — Canon U.S.A., Inc. IP Division

(57) ABSTRACT

A method of rendering virtual content is disclosed. A position to render each of a first and a second portion of virtual content on an augmented reality device is determined. Each of the first and second portion of virtual content is linked to a corresponding physical document. The position for rendering each of the first and second portions of virtual content is determined according to a position of the corresponding physical documents with the position of the first portion of virtual content being adjacent to the position of the second portion of virtual content. Viewing zones for each of the first and second portions of virtual content are determined, based on the determined positions. Each of the viewing zones is defined as a physical region where an augmentation of the corresponding portion of virtual content is visible on the augmented reality device. The viewing zone of the second portion of virtual content is modified to reduce any overlap with the viewing zone of the first portion of virtual content. The first and the second portions of virtual content are rendered on the augmented reality device according to the determined viewing zones.

8 Claims, 9 Drawing Sheets

(56) References Cited

U.S. PATENT DOCUMENTS

2011/0026838 A1* 2/2011 King .................... G06K 9/2072
382/209
2013/0346916 A1* 12/2013 Williamson ....... G01C 21/3647
715/800
2016/0267708 A1* 9/2016 Nistico .............. H04N 13/0022

* cited by examiner

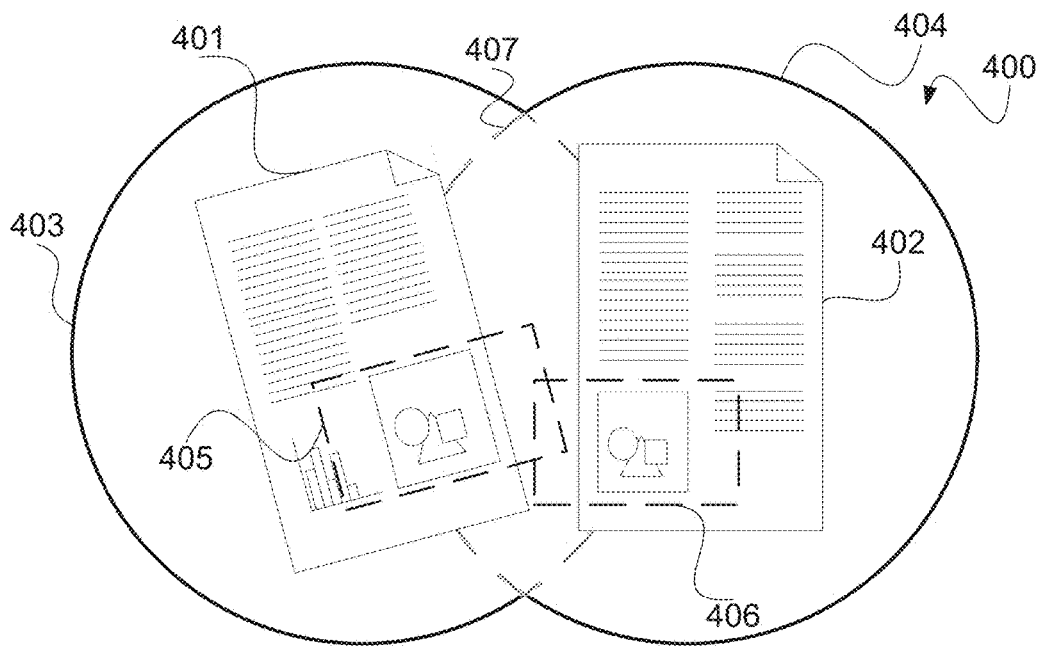
Before Zone Modification  Fig. 4A
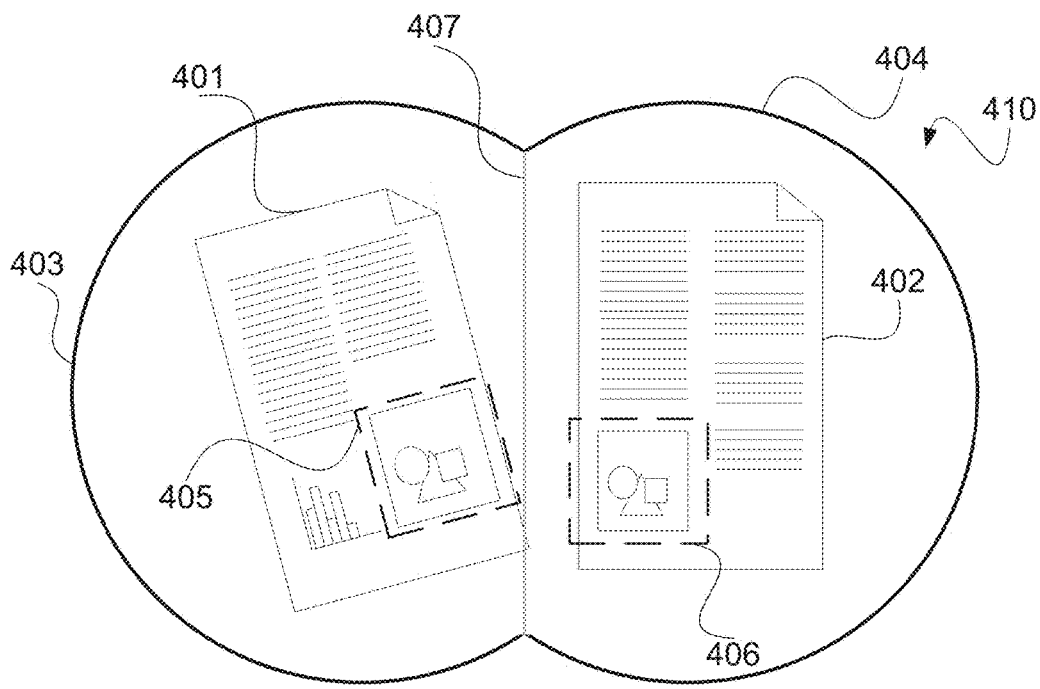
After Zone Modification  Fig. 4B

METHOD, APPARATUS AND SYSTEM FOR RENDERING VIRTUAL CONTENT

REFERENCE TO RELATED PATENT APPLICATION(S)

This application claims the benefit under 35 U.S.C. § 119 of the filing date of Australian Patent Application No. 2014202500, filed 8 May 2014, hereby incorporated by reference in its entirety as if fully set forth herein.

TECHNICAL FIELD

The present invention relates to the visibility of virtual content in an augmented reality environment and, in particular, to a method, apparatus and system for rendering virtual content. The present invention also relates to a computer program product including a computer readable medium having recorded thereon a computer program for rendering virtual content.

BACKGROUND

Printed documents have been a primary source of communication for many centuries. Printed documents have been used widely across different domains such as news reporting, advertisements, office environments (large and small offices alike) and so on. The last decade has witnessed an explosion in the popularity of hand-held mobile devices such as personal digital assistants, smart phones and more recently tablet devices. The ubiquitous nature of print media and the ever increasing popularity of the mobile hand-held devices have led to a new genre of applications based on augmented reality.

Augmented reality (or AR) is a view of a physical world where some elements of the physical reality are augmented by computer generated inputs such as sound, graphics and so on. Due to vast improvements in processing power and other capabilities, hand held devices are now able to host augmented reality applications. The host augmented reality applications enable an end-user to retrieve additional information related to a captured image of a real world object using a camera connected to a device (e.g. a camera phone) and augment the additional information to the real world object. Such a real-world object may be a natural image in a document, a piece of textual information, a physical object such as a printer and so on.

Conventional augmented reality methods have focused on sufficiently augmenting an object whereby, the more the system could augment the object, the better the augmented reality was deemed. However, the increase in microprocessor speed, memory capacity, data transfer bandwidth, and software functionality have enabled devices, such as AR glasses, the capacity to process and visualise greater virtual content; greater in size, complexity and amount. While such augmented reality can add information to the physical world, too much information can cause confusion and lessen a user's experience.

SUMMARY

It is an object of the present invention to substantially overcome, or at least ameliorate, one or more disadvantages of existing arrangements.

Disclosed are arrangements which seek to address the above problems by determining the viewing zones of virtual content and modifying the viewing zones to reduce any visual confusion caused by conflicting virtual contents.

According to one aspect of the present disclosure, there is provided a method of rendering virtual content, the method comprising:

determining a position to render each of a first and a second portion of virtual content on an augmented reality device, each of the first and second portion of virtual content being linked to a corresponding physical document, the position for rendering each of the first and second portions of virtual content being determined according to a position of the corresponding physical documents with the position of the first portion of virtual content being adjacent to the position of the second portion of virtual content;

determining viewing zones for each of the first and second portions of virtual content, based on the determined positions, each of the viewing zones defining a physical region where an augmentation of the corresponding portion of virtual content is visible on the augmented reality device, wherein the viewing zone of the second portion of virtual content is modified to reduce any overlap with the viewing zone of the first portion of virtual content; and rendering the first and the second portions of virtual content on the augmented reality device according to the determined viewing zones.

According to another aspect of the present disclosure, there is provided a system for rendering virtual content, the system comprising:

a memory for storing data and a computer program;

a processor coupled to the memory for executing the computer program, the computer program comprising instructions for:

determining a position to render each of a first and a second portion of virtual content on an augmented reality device, each of the first and second portion of virtual content being linked to a corresponding physical document, the position for rendering each of the first and second portions of virtual content being determined according to a position of the corresponding physical documents with the position of the first portion of virtual content being adjacent to the position of the second portion of virtual content;

determining viewing zones for each of the first and second portions of virtual content, based on the determined positions, each of the viewing zones defining a physical region where an augmentation of the corresponding portion of virtual content being visible on the augmented reality device, wherein the viewing zone of the second portion of virtual content is modified to reduce any overlap with the viewing zone of the first portion of virtual content; and rendering the first and the second portions of virtual content on the augmented reality device according to the determined viewing zones.

According to another aspect of the present disclosure, there is provided an apparatus for rendering virtual content, the apparatus comprising:

means for determining a position to render each of a first and a second portion of virtual content on an augmented reality device, each of the first and second portion of virtual content being linked to a corresponding physical document, the position for rendering each of the first and second portions of virtual content being determined according to a position of the corresponding physical documents with the position of the first portion of virtual content being adjacent to the position of the second portion of virtual content;

means for determining viewing zones for each of the first and second portions of virtual content, based on the determined positions, each of the viewing zones defining a physical region where an augmentation of the corresponding portion of virtual content being visible on the augmented reality device, wherein the viewing zone of the second portion of virtual content is modified to reduce any overlap with the viewing zone of the first portion of virtual content; and means for rendering the first and the second portions of virtual content on the augmented reality device according to the determined viewing zones.

According to another aspect of the present disclosure, there is provided a computer readable medium comprising a computer program stored on the computer readable medium, the computer program comprising:

code for determining a position to render each of a first and a second portion of virtual content on an augmented reality device, each of the first and second portion of virtual content being linked to a corresponding physical document, the position for rendering each of the first and second portions of virtual content being determined according to a position of the corresponding physical documents with the position of the first portion of virtual content being adjacent to the position of the second portion of virtual content;

code for determining viewing zones for each of the first and second portions of virtual content, based on the determined positions, each of the viewing zones defining a physical region where an augmentation of the corresponding portion of virtual content being visible on the augmented reality device, wherein the viewing zone of the second portion of virtual content is modified to reduce any overlap with the viewing zone of the first portion of virtual content; and code for rendering the first and the second portions of virtual content on the augmented reality device according to the determined viewing zones.

Other aspects of the invention are also disclosed.

BRIEF DESCRIPTION OF THE DRAWINGS

One or more embodiments of the invention will now be described with reference to the following drawings, in which:

FIG. 4A shows a view of two printed documents before zone modification has been performed on the documents in accordance with the method of FIG. 2;

FIG. 4B shows a view of two printed documents after zone modification has been performed on the documents in accordance with the method of FIG. 2;

DETAILED DESCRIPTION INCLUDING BEST MODE

Figure 1A:
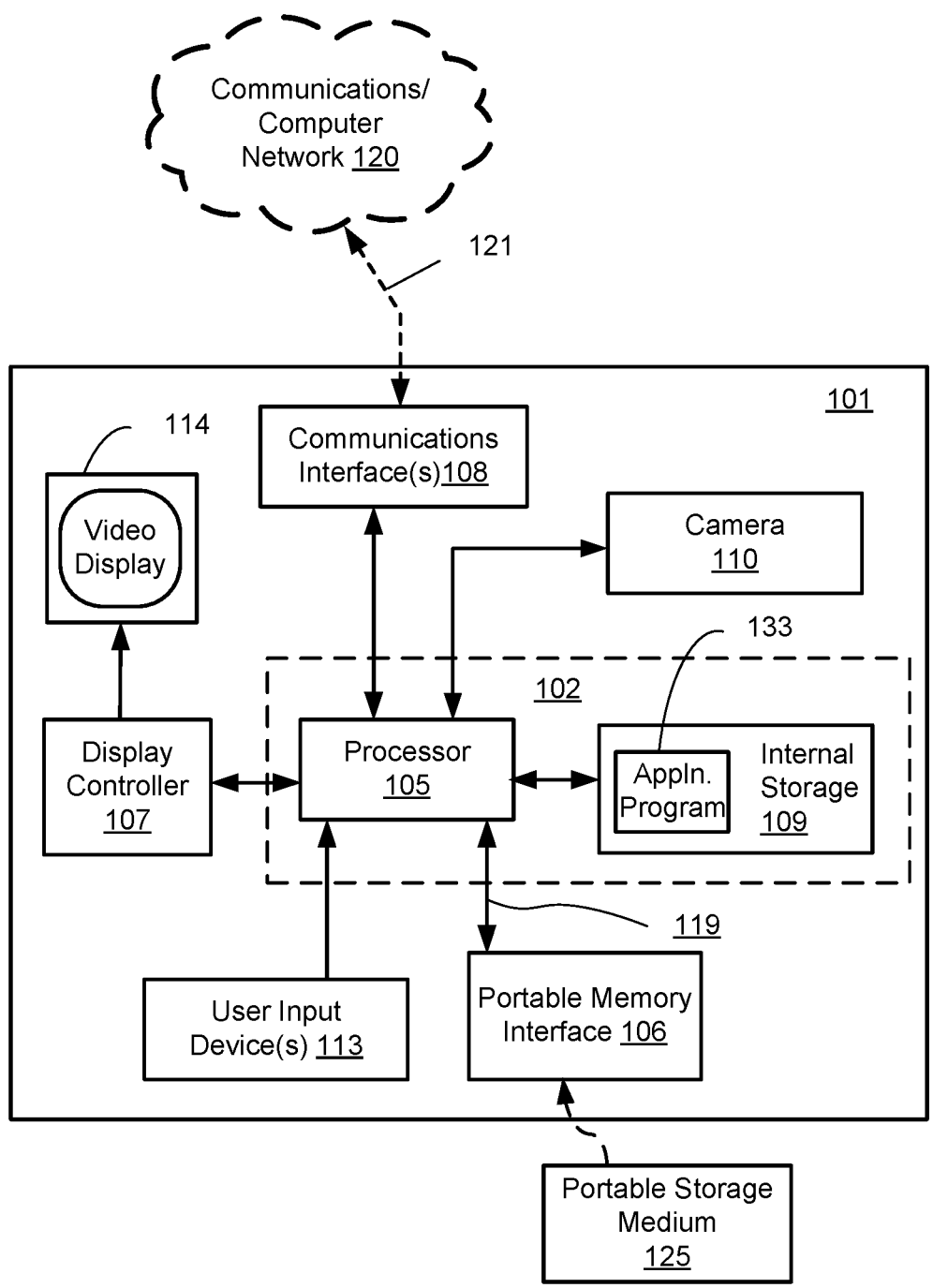
FIGS. 1A and 1B collectively form a schematic block diagram representation of an augmented reality display device upon which described arrangements can be practised.

Augmented reality involves the addition of virtual content to a scene captured by a camera. The location of the virtual content may be fixed relative to an augmented reality device. The augmented reality device may also be referred to as a "viewer". The augmented reality device may be in the form of a device comprising a capture device (e.g., a camera or other scanning device) and a display on which virtual content may be displayed. For example, the augmented reality device may be in the form of a mobile device such as a mobile phone, a portable media player, a digital camera, a tablet, glasses or augmented reality goggles. The augmented reality device may also be in the form of desktop computer, server computer, and other such devices.

Alternatively, the location of the virtual content may be fixed relative to an object in a captured scene. The virtual content may be linked to a printed document so that when the printed document is recognised in an image of a captured scene the virtual content is displayed in a position relative to the printed document. A single document may contain a single or multiple pages. A definition of the document contains all information necessary for printing pages of the document. The definition of the document is typically provided in the form of a description of the page to be printed, specified using a high-level Page Description Language (PDL), such as Adobe® PDF or Hewlett-Packard® PCL. The PDL provides descriptions of graphic objects to be rendered onto pages of the document in a rendering order (z-order). The graphic objects are typically made up of artifacts such as text, lines, fill regions, and image data. A raster representation of each page of the document is made up of colour pixel data generated from the PDL by generating raster representations of the graphic objects.

"Virtual content" associated with graphic objects may be defined as computer-generated sensory input such as sound, video or graphics that is added to an image captured by a camera. Virtual content may also be referred to as "augmented content". The image of a captured scene is displayed to a user along with the virtual content. For any objects located in the image, points of interest are located within the object and may be extracted to provide a "feature vector" for the object. A feature vector for an object is determined for a keypoint located at an XY coordinate position within the image captured by the camera. The feature vector is formed by a set of numbers associated with neighbouring pixels of the keypoint. A "feature set" refers to two or more feature vectors associated with the same image. The term "strong feature" refers to a feature vector that may be determined for an image even when the image has undergone some form of affine transformation.

Feature sets may be used to locate a document matching the image from a database containing the document. To locate the matching document, the feature vectors from the feature set of the image are compared to the feature vectors of the document in the database. Once a match is located, information about the matching document may be retrieved from the database. The database may also contain information, such as a three-dimensional volume associated with the document. The three-dimensional volume associated with the document is represented by a "zone value". The three-dimensional volume associated with the document is referred to below as a "viewing zone", "document zone", or "viewing region". However, the three-dimensional volume associated with a document will be referred to below as a "viewing zone".

The following describes a method of selecting a portion of virtual content and rendering the portion of virtual content on an augmented reality display device. The method will be described below by way of example where the portion of virtual content is in the form of a virtual document. However, as described above, the virtual content may be in the form of any computer-generated sensory input and classed as either visual virtual content, like video and graphics or audio virtual content, like music and audio recordings. The visual virtual content may be added to an image captured by a camera while the audio virtual content may be played out on a speaker. As described below, the virtual document is selected from a plurality of virtual documents (or "collection" of virtual documents).

The described method renders virtual content, in the form of the virtual document, on an augmented reality display device. Each virtual document is linked to a physical document. The position of the virtual documents rendered on a display of the augmented reality display device is linked to a physical document, so that the positions of each of the virtual documents is determined according to a position of the corresponding physical documents.

Physical documents are located in an image captured by the augmented reality display device. The virtual documents, along with viewing zone information, linked to the physical documents, are retrieved from a database. A location of the physical documents in the image is used by the augmented reality display device for determining a position to render each of the portions of virtual content (e.g., a first and second portion of virtual content) in the form of the virtual documents. The portions of virtual content (e.g., a first and second portion of virtual content) may be rendered on the augmented reality display device. Each of the virtual documents is linked to a corresponding physical document. The location of each virtual document, relative to the physical document, is predetermined and stored in the database along with the viewing zone information and the virtual document.

When two of the physical documents are positioned adjacent to each other, the viewing zones associated with the physical documents may overlap. The overlap can cause an area where a user can see both virtual documents at the same time. As more physical documents are added to a space the viewing zones of the additional physical documents may allow all of the corresponding virtual documents to be visible at the same time. To avoid problems occurring with overlapping viewing zones, the methods described in detail below determine the viewing zones for the virtual document and then modify the viewing zones to reduce the overlap between the viewing zones. The modification may take a number of forms, such as reducing the size of an area where two viewing zones overlap, or eliminating the overlapping zone. Appropriate viewing zones are then used to select virtual documents to render for display to a user according to the location of the augmented reality display device. The positions of each of the virtual documents (e.g., each of the first and second portions of virtual content) are determined according to a position of the corresponding physical documents.

Figure 1B:
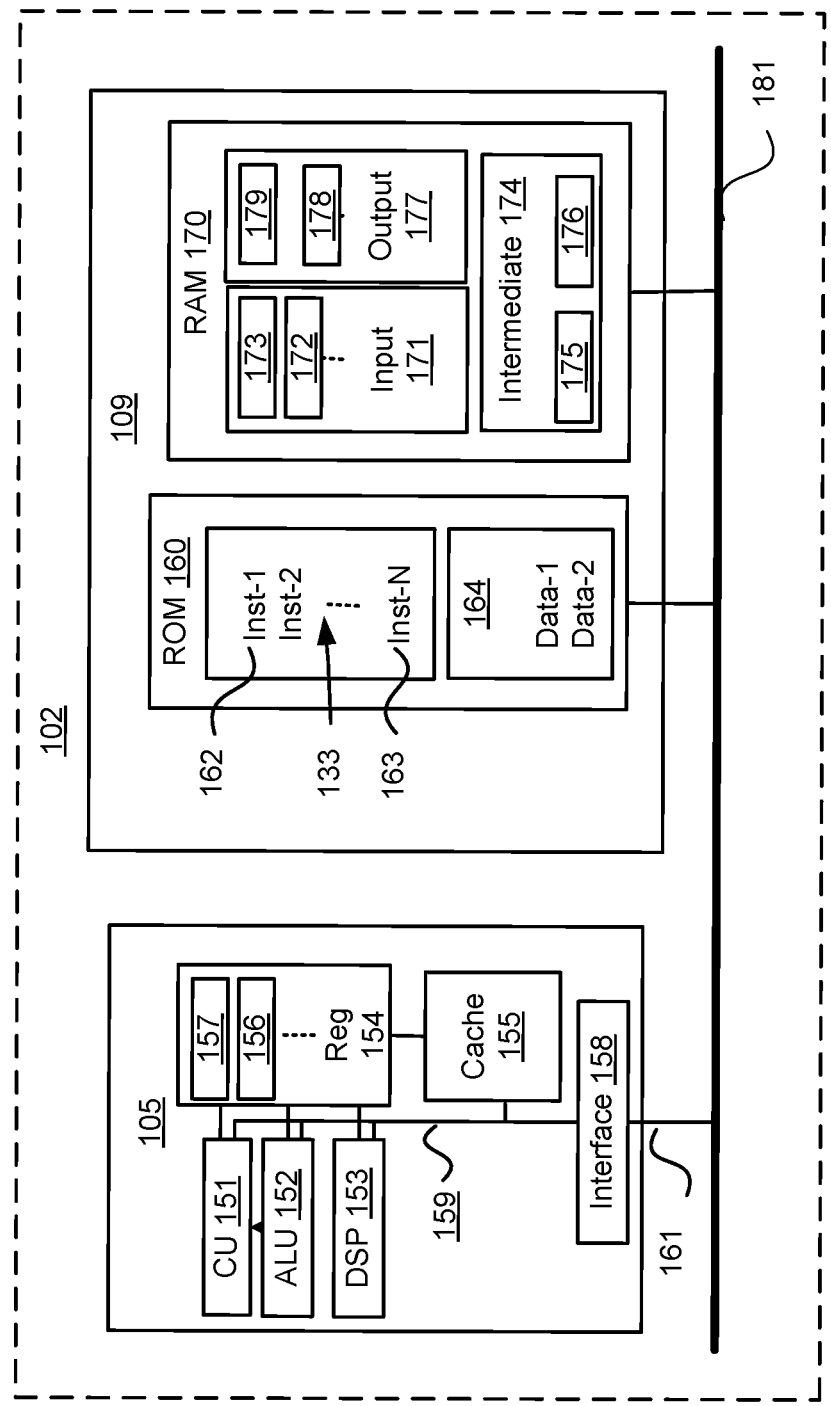

FIGS. 1A and 1B collectively form a schematic block diagram of an augmented reality device 101, upon which the described method of displaying a virtual document, and other methods to be described, may be practiced. The augmented reality device 101 may be used to capture an image of a printed document 195 containing virtual content.

As described above, the augmented reality device 101 is a mobile device such as a mobile phone, a portable media player, a digital camera, a tablet or augmented reality goggles, in which processing resources are limited. The device 101 may also be practiced on other mobile devices comprising a camera, or other scanning device, and a display on which augmented content may be displayed. The described method of displaying a virtual document, and other methods to be described, may also be performed on higher-level devices such as desktop computers, server computers, and other such devices with significantly larger processing resources.

As seen in FIG. 1A, the device 101 comprises an embedded controller 102. Accordingly, the device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The device 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The device 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the device 101 also comprises a portable memory interface 106, which is coupled to the processor 105 via a connection 119. The portable memory interface 106 allows a complementary portable memory device 125 to be coupled to the device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 101 also has a communications interface 108 to permit coupling of the device 101 to a computer or communications network 120 via a connection 121. The connection 121 may be a wired or wireless connection. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the device 101 is configured to perform some special function. The embedded controller 102, possibly in conjunction with further special function components, is provided to perform that special function. As described here, the device 101 comprises a capture device in the form of a digital camera 110 comprising a lens, focus control and image sensor of the camera. The camera 110 is connected to the embedded controller 102.

However, as another example, the device 101 may be a mobile telephone handset. In this instance, the device may comprise components required for communications in a cellular telephone environment. Where the device 101 is a mobile (or portable) device, the device 101 may also comprise a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the processes of the described methods may be implemented as one or more software application programs 133 executable within the embedded controller 102. The device 101 of FIG. 1A may be used to implement the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the device 101. However, in some instances, the application programs 133 may be supplied to the user encoded on one or more CD-ROM (not shown) and read via the portable memory interface 106 of FIG. 1B prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the device 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the device 101.

The execution of a set of the instructions may require numeric variables to be read and modified. Such numeric variables are stored in the RAM 170. The described methods use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the described methods is associated with one or more segments of the application program 133, and is performed by repeated execution of a fetch-execute cycle in the processor 105 or similar programmatic operation of other independent processor blocks in the device 101.

Figure 1C:
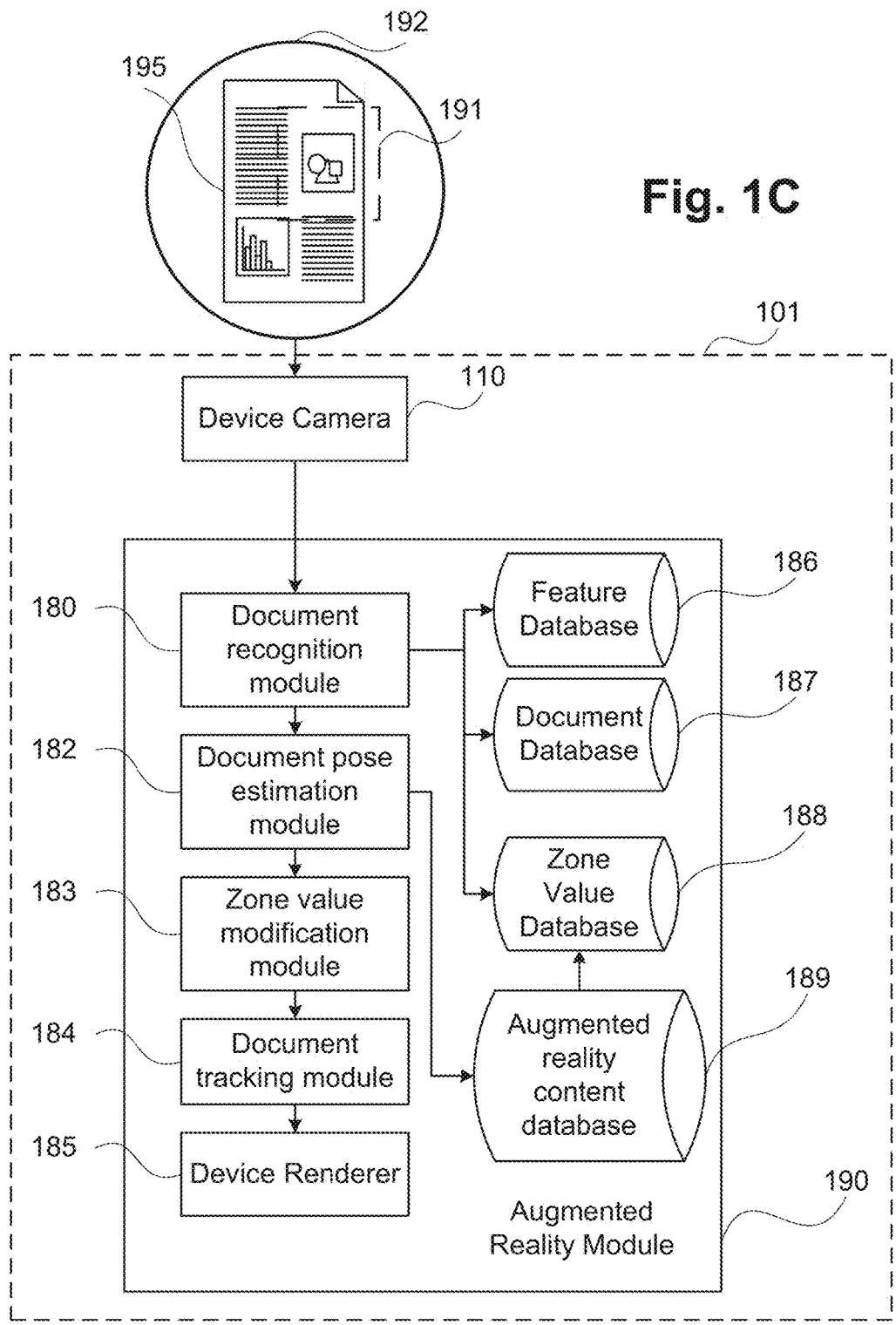
FIG. 1C shows a software architecture for the device of FIGS. 1A and 1B, together with an example document having an associated viewing zone and associated augmented content.

FIG. 1C shows a software architecture for the augmented reality device 101 according to one arrangement. As described above, the augmented reality device 101 comprises a capture device in the form of a camera 110. The augmented reality device 101 also comprises an augmented reality module 190. The augmented reality module 190 comprises modules 180, 182, 183, 184 and 185 which may be formed as one or more software code modules of the software application program 133 which will be described in detail below.

FIG. 1C also shows an example physical document 195. In the example of FIG. 1C, the document 195 contains text, images and a chart as typically found in office documents. An augmentable region 191 shows an image region within the document 195 that may be augmented by the augmented reality device 101 with virtual content such as a virtual document. The document 195 and virtual content associated with the document 195 is created by a document author using a suitable authoring tool for the document 195 and the virtual content. An author of the document 195 can distribute the document 195 by registering a copy of the document 195 with the device 101 through the network connection 121 which may be a wireless connection. At the time of document registration, virtual content associated with the document 195 is transferred to memory 160 of the device 101 through the network connection 121.

As seen in FIG. 1C, viewing zone 192 represents a three-dimensional volume associated with the example document 195. The document viewing zone 192 is defined by a zone value stored within a zone value database 188 that may be configured within the storage module 109 of the device 101. The zone value database 188 will be described in detail below. In the example of FIG. 1C, the three dimensional volume of the viewing zone is represented by a hemisphere. However, other shapes, such as an elongated rectangle, may also be used to represent the viewing zone 192.

The device camera 110 may capture an image of a scene comprising two or more printed physical documents in a field of view of the camera 110. The captured image is stored in the storage module 109 of the device 101 as a bitmap image before transferring the captured image to the augmented reality module 190. The augmented reality module 190 takes images as input and processes the images according to methods 200 and 300 described below in relation to FIG. 2 and FIG. 3, respectively.

The augmented reality module 190 comprises a document recognition module 180 which receives an input image, and locates and identifies any physical documents displayed within the received image. The document recognition module 180 produces a feature set for any document located in the input image using a feature extractor such as Scale Invariant Feature Transform (SIFT). The document recognition module 180, under execution of the processor 105, uses a geometric verification algorithm to remove outlying features from the feature set. The geometric verification algorithm implements an affine transformation to match x,y coordinate locations of features in the input image to features stored in a feature database 186 configured within the storage module 109. Features whose x,y coordinate location are not matched are considered outliers and removed from a final feature set.

Upon receiving the input image, the document recognition module 180, under execution of the processor 105, extracts feature vectors from the image using the feature extractor. The document recognition module 180 then queries the feature database 186 configured within the storage module 109 to determine if a physical document located within the input image has features matching features stored in the feature database 186. If matching features are found within the feature database 186 then a document identifier associated within the matching features is retrieved from the feature database 186. The document identifier is used to locate a matching virtual document stored in a document database 187 configured within the storage module 109. The feature database 186 and the document database 187 will be described in detail below.

A list of matching feature vector pairs may be generated if the document recognition module 180 determines that there is more than one feature vector in the feature database 186 that matches the document feature vector. Once the list of matching feature pair vectors has been generated, the document recognition module 180 uses the geometric verification algorithm to remove outlying features within the input image. The geometric verification algorithm removes outliers by checking whether the x,y coordinate location of features within the input image correspond with the same x,y location of matching features within the feature database 186. Feature vector pairs having x,y locations that do not match are discarded as outliers. Geometric verification can be achieved using an algorithm such as RANSAC (RANdom SAmple Consensus). RANSAC is used to fit a model that is capable of transforming x,y locations of features within the input image to x,y locations of features within the feature database 186.

Viewing zone information (or "document zone" information) may then be retrieved once a physical document in the input image has been matched to a virtual document in the document database 187. The viewing zone information is retrieved from a viewing zone value database 188 using a unique document identifier that is associated with a document stored within the document database 186. The zone value database 188 will be described in further detail below. A document pose estimation module 182 takes a collection of matching keypoints determined based on the match between the physical document in the input image and the matching virtual document from the document database 187. The matching keypoints are used to produce as output a pose matrix that may determine the physical location of the physical document with respect to the augmented reality device 101 using real world coordinates. A pose matrix is calculated using a pinhole camera model and the coordinates of matched feature vector pairs within the input image and an original raster image. The original raster image is the image of a physical document within the document database 187. A pinhole camera model is a simple and common camera model used in computer vision. The pinhole camera model defines the relationship between a point in 3D physical space (X, Y, Z) and corresponding image pixel coordinates (u, v) as captured by the camera 110. According to the pinhole camera model, a point in three dimensional space (X, Y, Z) and corresponding image pixel coordinates (u, v) are related by a linear equation according to Equation 1, below.

$$s \begin{bmatrix} u \\ v \\ 1 \end{bmatrix} = A \begin{bmatrix} r_{11} & r_{12} & r_{13} & t_1 \\ r_{21} & r_{22} & r_{23} & t_2 \\ r_{31} & r_{23} & r_{33} & t_3 \end{bmatrix} \begin{bmatrix} X \\ Y \\ Z \\ 1 \end{bmatrix}$$

where A is a 3×3 matrix called an intrinsic matrix. The intrinsic matrix of the camera 110 describes the scaling of image pixels. The extrinsic matrix $$\begin{bmatrix} r_{11} & r_{12} & r_{13} & t_1 \\ r_{21} & r_{22} & r_{23} & t_2 \\ r_{31} & r_{23} & r_{33} & t_3 \end{bmatrix}$$

describes the position and orientation of the camera 110 relative to the surface captured by the camera 110.

$$\begin{bmatrix} r_{11} & r_{12} & r_{13} \\ r_{21} & r_{22} & r_{23} \\ r_{31} & r_{23} & r_{33} \end{bmatrix}$$

is the rotation matrix and $(t_1, t_2, t_3)$ is the translation vector. s is a normalization scalar that ensures the third element in $$\begin{bmatrix} u \\ v \\ 1 \end{bmatrix}$$

equals one (1).

To generate the intrinsic matrix, the described methods use the camera calibration functions provided by the OpenCV (http://opencv.willowgarage.com) computer vision library. Camera calibration is performed by printing a chessboard pattern, mounting the chessboard pattern to a rigid flat surface and capturing a number of images of the chessboard pattern using the camera 110. Images of the chessboard pattern are captured when the chessboard is held in eight (8) or more different orientations within the field-of-view of the camera 110. An image of the chessboard pattern is also captured when the chessboard pattern is placed at a surface. Using the functions of the OpenCV library, image coordinates of the chessboard corners are determined and intrinsic matrices are generated.

Once the translation vector has been determined, a position of the augmented reality device 101, relative to the identified physical document in real world coordinates, is also determined.

Viewing zone value modification module 183 receives a viewing zone value associated with a matching document. The zone value modification module 183 executes a method 200 of rendering virtual content, using zone value modification, which will be described in detail below with reference to FIG. 2. The zone value modification module 183 outputs a modified viewing zone, the associated document identifier, any matched feature vector pairs and associated virtual content.

Document tracking module 184 receives the matched feature vector pairs and uses a tracking algorithm to track keypoints in the input image document between successive frames received from the camera 110. The tracking algorithm can perform frame-to-frame keypoint cross-correlation. The document tracking module 184 outputs a set of updated matched feature vector pairs that are then used as input to the document pose estimation module 182.

Device renderer module 185 renders virtual content associated with each physical document when the augmented reality device 101 is located within the viewing zones associated with a recognised physical document captured by the camera 110. Virtual content is rendered by the device 101 when conditions described below in relation to the method 200 of FIG. 2.

The feature database 186 is configured according to a data structure configured to perform a look up, for example, using a KD-tree that can be used for finding matching nearest neighbours for each input feature. The feature database 186 stores features extracted from images generated for each page of physical documents stored within the document database 187. When queried based on a query feature vector, the feature database 186 returns any features that are located within a predetermined volume near the query feature vector.

The document database 187 is a relational database that may contain a raster image of each page of each physical document, a digital copy of the physical document and a unique document identifier associated with the physical document that can be used to query the document database 187. Viewing zone value database 188 is a relational database containing a document viewing zone value and an associated document identifier. Each document viewing zone value describes a three-dimensional volume associated with each physical document stored within the document database 187. The viewing zone value database 188 receives a document identifier which is used to retrieve the document viewing zone value associated with the physical document stored within the document database 187.

Augmented reality content database 189 is a relational database containing a document identifier and digital virtual content (or augmented content) associated with a physical document corresponding to the document identifier. The virtual content stored within the augmented reality content database 189 is rendered by the device renderer module 185 under execution of the processor 105. Digital virtual content stored within the augmented reality content database 189 may include documents, video, text and hyperlinks to other content.

Figure 2:
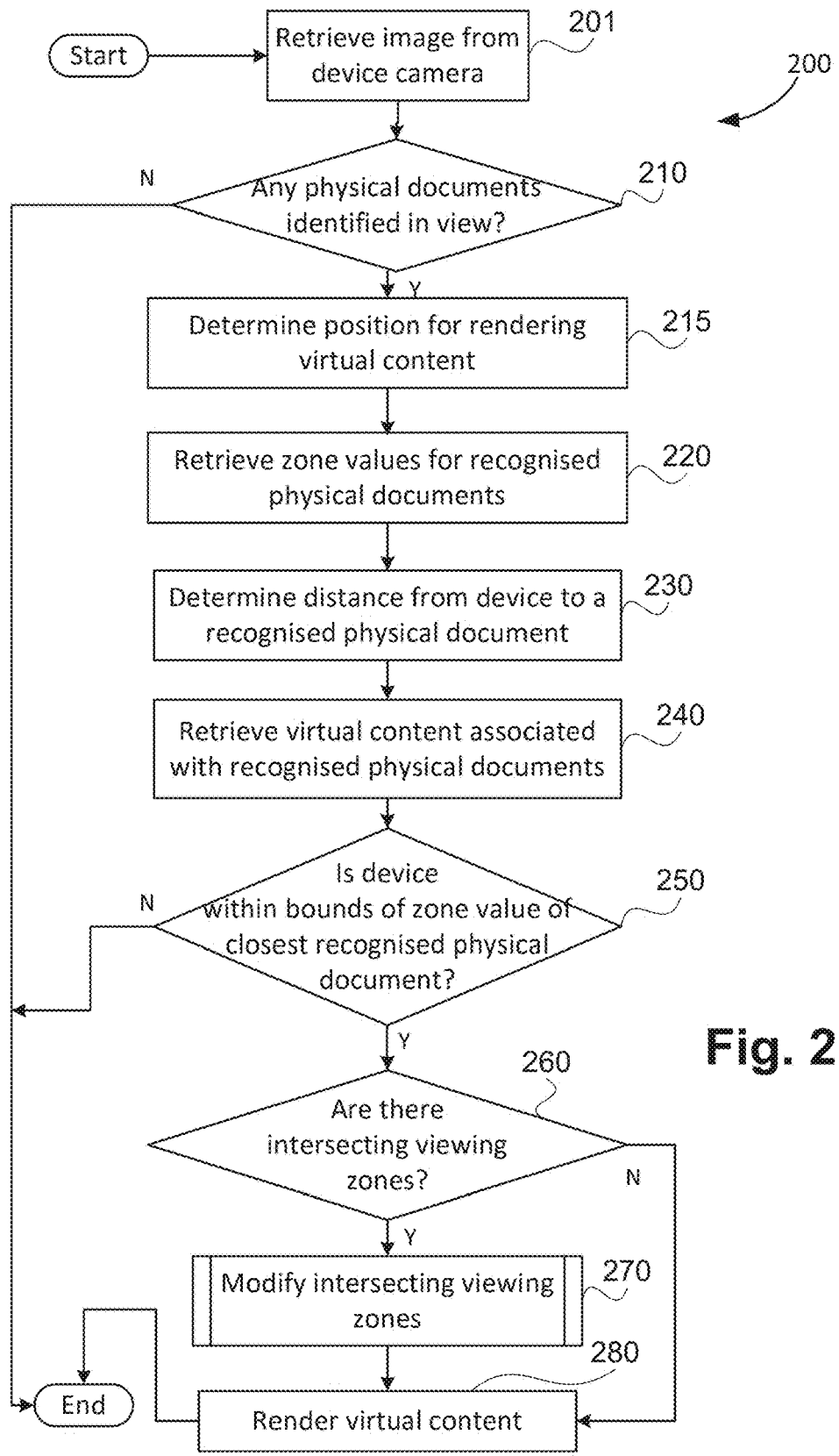
FIG. 2 is a schematic flow diagram showing a method rendering virtual content.

The method 200 of rendering virtual content will now be described with reference to FIG. 2. The method 200 may be used for displaying virtual content in the form of virtual documents, for example. However, the virtual content may include one or more of video, text and hyperlinks to other content. The method 200 is implemented by the augmented reality module 190, resident in the storage module 109 of the device 101 and being controlled in its execution by the processor 105. The method 200 uses the document recognition module 180, documents pose estimation module 182, zone value modification module 183 and the document tracking module 184.

As described above, the modules 180, 182, 183, 184 and 185 may be formed as one or more software code modules of the software application program 133. The method 200 will be described by way of example where the rendered virtual content is in the form of virtual documents. However, as described above the virtual content may also be in the form of video, text and hyperlinks to other content.

The method 200 begins at an image retrieval step 201 where the augmented reality module 190, under execution of the processor 105, retrieves a raster image from the camera 110. The retrieved raster image shows a view of a scene captured using the device camera 110. The method 200 then proceeds from step 201 to a document recognition step 210.

At the document recognition step 210, the document recognition module 180, under execution of the processor 105, identifies any known physical documents within the view represented by the raster image. Each of the physical documents is linked to corresponding virtual content in the form of a virtual document. The physical documents are identified at step 210 using the feature extractor on the device 101 and the feature database 186. If no physical documents are recognised within the view of the raster image at step 210, by the document recognition module 180, then the method 200 ends. Otherwise, if one or more physical documents are identified at step 210, then the method 200 proceeds to a zone retrieval step 220. Details for the one or more recognised physical documents may be stored in the storage module 109.

At step 215, the processor 105 is used for determining a position to render the virtual content, corresponding to the recognised physical documents, on the display 114 of the augmented reality display device 101. In the example being used to describe the method 200, the virtual content comprises a first and a second portion of virtual content, each of the first and second portion of virtual content being in the form of a virtual document where each of the virtual documents is linked to a corresponding physical document.

The position for rendering each of the virtual documents is determined according to a position of the corresponding physical documents. The location for rendering each virtual document, relative to the physical document, is predetermined and stored in the database 188 along with the viewing zone information. In the example being used to describe the method 200, the position of one of the virtual documents (or first portion of virtual content) is adjacent to the position of the other virtual document (or second portion of virtual content). After step 215, the method 200 proceeds to a zone retrieval step 220.

At the zone retrieval step 220, the document recognition module 180, under execution of the processor 105, is used for determining viewing zones for each of the virtual documents (or each of the first and second portions of virtual content) corresponding to the physical document recognised at the document recognition step 210. A zone value associated with each of the recognised physical documents is retrieved at step 220 by the document recognition module 180. The zone values are retrieved at step 220 in the manner described above with reference to FIG. 1. After the zone retrieval step 220, the method 200 proceeds to a pose calculation step 230. Each of the viewing zones is used for defining a physical region where an augmentation of the corresponding portion of virtual content is visible on the augmented reality display device 101.

At step 230, the document pose estimation module 182, under execution of the processor 105, determines a distance from the device 101 to a closest one of the recognised physical documents identified within the raster image as described above with reference to FIG. 1. The determined distance, along with any rotation information of rotation between the camera and the document, represents the pose of the device 101. After the pose calculation step 230, the method 200 proceeds to a virtual content retrieval step 240.

At step 240, the pose estimation module 182, under execution of the processor 105, retrieves the virtual (or augmented) content associated with the recognised physical documents from the augmented reality content database 189 configured within the storage module 109. In the example being used to describe the method 200, the virtual content retrieved at step 240 comprises a first and a second portion of virtual content, each of the first and second portion of virtual content being in the form of a virtual document. After the retrieval of the virtual content at step 240, the method 200 proceeds to a zone detection step 250.

At the zone detection step 250, the document pose estimation module 182, under execution of the processor 105, determines if the device 101 is within the bounds of the zone value of the closest recognised physical document (i.e., within the "viewing zone" of the closest recognised document). The determination is made at step 250 using a translation vector from the pose determined at step 230 and the zone value retrieved at step 220 for the closest recognised physical document. Each zone value defines a three-dimensional volume that is associated with a physical document.

If the device 101 is not within the bounds of the zone value of the closest recognised physical document, then the method 200 ends. If, at the zone detection step 250, the device 101 is within the bounds of the zone value of the closest recognised physical document (i.e., within the viewing zone of the closest recognised document) then the method 200 proceeds from zone detection step 250 to a zone intersection step 260.

At the zone intersection step 260, the zone value modification module 183, under execution of the processor 105, uses the retrieved zone values from the zone retrieval step 220 to determine if there are intersecting (or overlapping) viewing zones. If at the zone intersection step 260, the zone value modification module 183 determines that there are no intersecting viewing zones then the method 200 proceeds from zone intersection step 260 to a rendering step 280. If at the zone intersection step 260 the zone value modification module 183 determines that there are intersecting viewing zones, then the method 200 proceeds from step 260 to zone value modification step 270. At the zone modification step 270, the zone value modification module 183, under execution of the processor 105, modifies the zone values for viewing zones that are intersecting to modify the viewing zones. The zone value modification module 183 reduces or removes any overlap between viewing zones and augmented content as described above with reference to FIG. 1. For example, a single zone value associated with a viewing zone of one virtual document (or the second portion of virtual content) may be modified to reduce any overlap with the viewing zone of another virtual document (or the first portion of virtual content). A method 300 of modifying zone values, as executed at step 270, is described below with regard to FIG. 3. Following step 270, the method 200 proceeds to rendering step 280.

At the rendering step 280, the device rendering module 185, under execution of the processor 105, is used for rendering the virtual content (or augmented content) retrieved from the augmented reality content database 189 (e.g., the first and second portions of virtual content) at step 240 to the display 114 of the augmented reality device 101. The virtual content is rendered according to the modifications made to both the viewing zones (zone values) and the virtual content as described with reference to step 270. Following the rendering step 280, the method 200 concludes.

Figure 3:
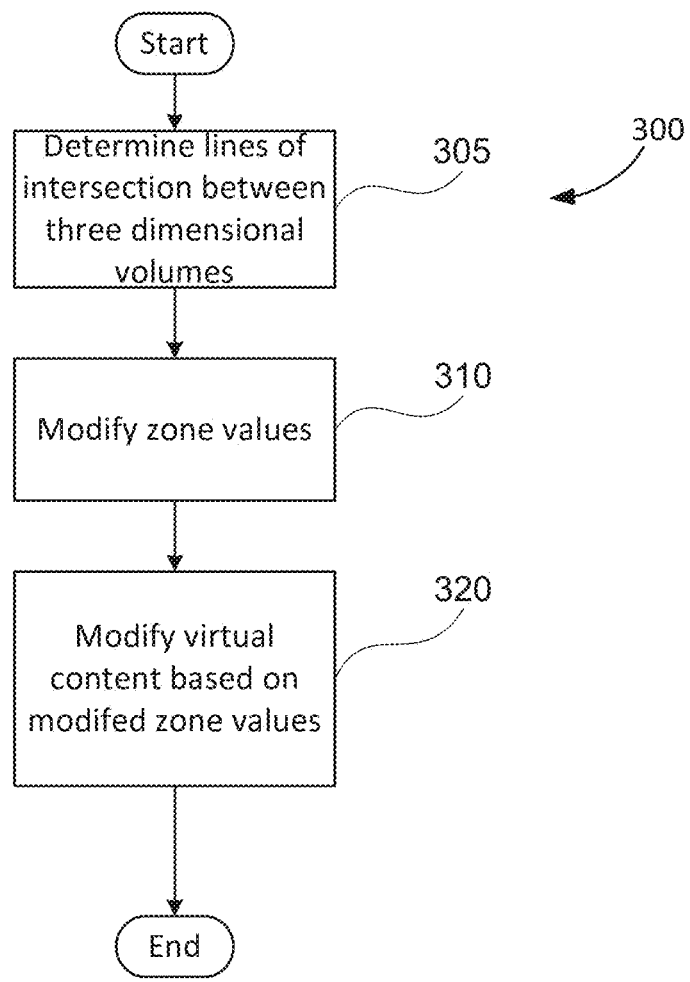
FIG. 3 is a schematic flow diagram of a method of modifying zone values.

The method 300 of modifying zone values, as executed at step 270, will now be described below with reference to FIG. 3. The method 300 is implemented by the augmented reality module 190, resident in the storage module 109 of the device 101 and being controlled in its execution by the processor 105.

The method 300 begins at zone overlap detection step 305, where the zone value modification module 183, under execution of the processor 105, uses three-dimensional geometry to determine lines of intersection between three-dimensional volumes described by the zone values of intersecting viewing zones identified at step 260. A new plane of intersection, parallel to each line of intersection is determined at step 305. Following the zone overlap detection step 305, the method 300 proceeds to a zone value modification step 310.

At the zone value modification step 310, the zone value modification module 183 modifies the zone values for each viewing zone that crosses each plane of intersection determined at step 305, such that the three-dimensional volume described by a particular zone value is limited by a corresponding plane of intersection determined at step 305. The zone values are modified at step 310 to reduce overlap between any intersecting viewing zones. Following the zone value modification step 210, the method 300 proceeds to an augmented content modification step 320.

At the augmented content modification step 320, the zone value modification module 183, under execution of the processor 105, modifies the virtual content for each physical document where the zone value for the physical document was modified at step 310. For example, the zone value modification module 183 may reduce the size of the augmentable region of a particular physical document to ensure that associated virtual content is confined within a new viewing zone (document zone or viewing region) described by a modified zone value determined for the particular document at step 310.

Figure 7:
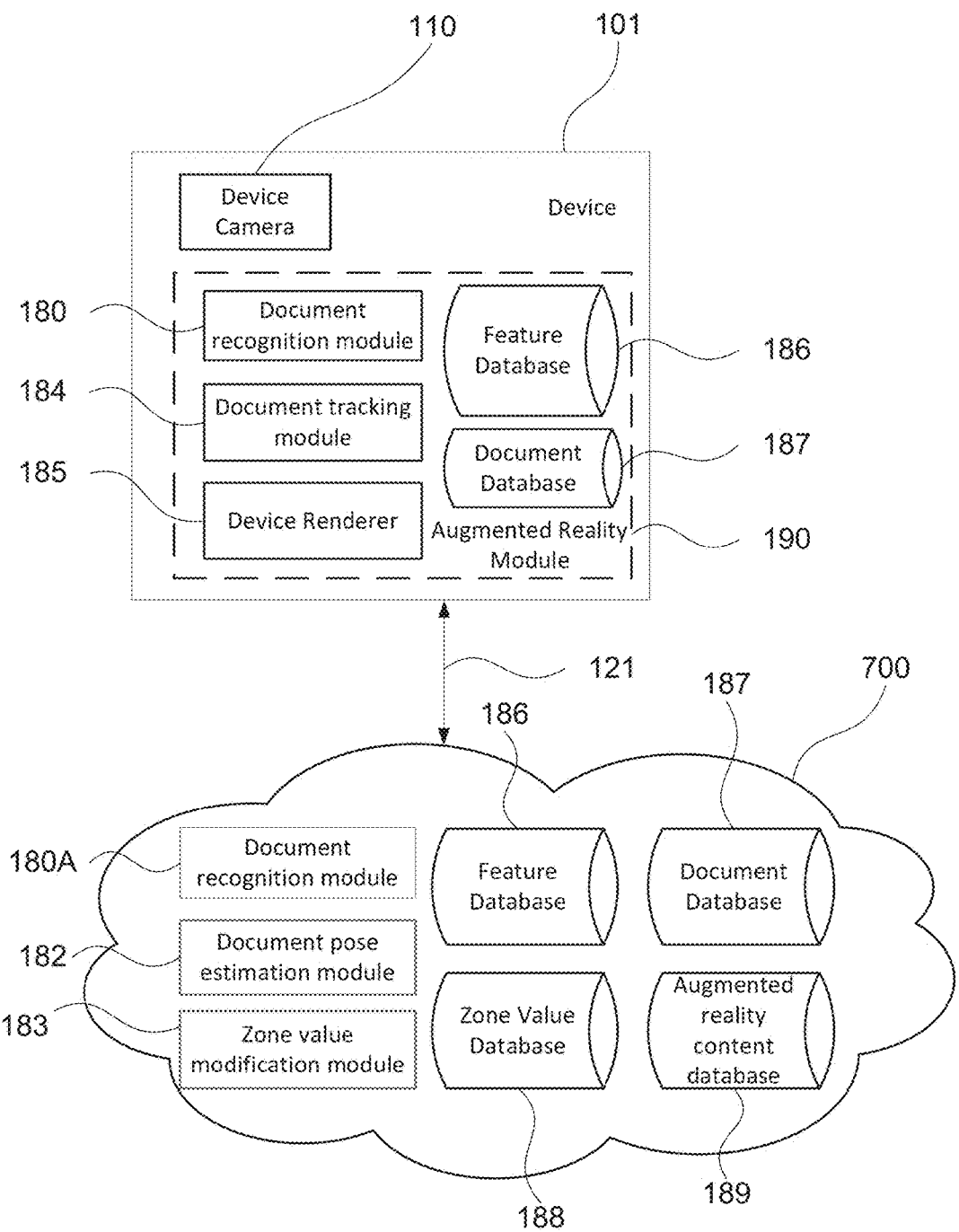
FIG. 7 shows another software architecture for the device of FIGS. 1A and 1B.

FIG. 7 shows an alternate software architecture to the software architecture shown in FIG. 1C for the augmented reality device 101. In the arrangement of FIG. 7, the client device 101 communicates with a cloud service 700 via the network connection 121. As described above, the connection 121 may be a wired or a wireless connection. In the arrangement of FIG. 7, the device 101 comprises the camera 110 and the augmented reality module 190. The augmented reality module 190 of FIG. 7 contains the document recognition module 180, document tracking module 184, device renderer module 185, feature database 186 and document database 187.

The cloud service 700 comprises another document recognition module 180A which is similar to the document recognition module 180. As described below, the document recognition module 180A may be used to recognise the physical documents as at step 210 of the method 200.

The cloud service 700 also comprises the document pose estimation module 182, the zone value modification module 183, the feature database 186, the document database 187, the zone value database 188 and the augmented reality content database 189. For example, the cloud service 700 may be used to modify the viewing zone of the second portion of virtual content as described above. The modules 180A, 182, 183, 186, 187 and 188 of the cloud service 700 may be configured within a server, for example, connected to the network 120.

In the arrangement of FIG. 7, the device 101 is configured to recognise physical documents using the feature document recognition module 180, feature database 186 and the document database 187 within the augmented reality module 190 as described above with reference to FIG. 2. If the device 101 is unable to recognise a physical document, the device 101 queries the cloud service 700 using a raster image of the field of view of the device 101. The cloud service 700 can receive raster images from the device 101, recognise physical documents and retrieve the zone values and augmented content of the recognised documents using the cloud service document recognition module 180A, the feature database 186, the document database 187 and zone value databases 188 using the method 200 as described above.

Upon recognising a document, the cloud service 700 determines the pose of the device 101 using the document pose estimation module 182 and retrieves any virtual content associated with the recognised documents using the augmented reality content database 189. The cloud service 700 may then modify viewing zones (or document zones, or viewing regions) and virtual content using the zone value modification module 183 in accordance with the method 200 described above. After modifying viewing zone values, the cloud service 700 transmits the modified zone values, augmented content and device pose to the device 101. Upon receiving the modified zone values, virtual content and device pose, the device 101 may use the document tracking module 184 to track documents between successive frames received by the device camera 110, and use the device renderer module 185 to render the virtual content associated with the recognised documents according to the received modified zone values.

In one arrangement, at the zone value modification step 310 of the method 300, the zone value modification module 183 is configured to prevent the device renderer module 185 from rendering virtual content onto the augmentable region of the document/s that are furthest from the device 101, even when the device 101 is within the viewing zone of the document. The prevention of the device renderer module 185 from rendering augmented content may be referred to as "suppressing the virtual content" or "virtual content suppression". Following augmented content suppression, the zone value modification module 183 ensures that the device renderer module 185 renders an augmented indicator 640 as shown for example in FIG. 6. The augmented indicator 640 is rendered in place of the virtual content that was suppressed. For example, the first portion of virtual content described above may be suppressed and the augmented indicator 640 may be rendered in place of the first portion of virtual content.

When the user of the device 101 subsequently provides input, for example, by touching the augmented indicator 640 displayed on the display 114, the device renderer module 185 displays any virtual content that was suppressed. The virtual content is displayed over an augmentable region 660 for a document 610 which is associated with the augmented indicator 640. Upon displaying the suppressed virtual content, the device renderer module 185 then suppresses virtual content from the document/s whose viewing zone encompasses the device 101.

In another arrangement, the zone value modification module 183 only modifies a single viewing zone at step 310 of the method 300. In such an arrangement, the viewing zone modified is of the document that has a smallest augmentable region. The smallest augmentable region is selected based on the area, in pixels, of the augmentable region (e.g., augmentable region 760).

FIGS. 4A and 4B are schematic diagrams showing views 400 and 410, respectively, of two example physical documents 401 and 402. For example, the documents 401 and 402 may have been printed. The view 400 shows the documents 401 and 402 before the zone modification step 310 is executed by the zone value modification module 183 for the documents 401 and 402. The view 410 shows the documents 401 and 402 after the zone modification step 310 is executed by the zone value modification module 183 for the documents 401 and 402.

The view 400 of the two physical documents 401 and 402 shown in FIG. 4A is not a view that is displayed to users of the device 101, as overlapping viewing zones, such as viewing zone 405 and 406, are not rendered by the device renderer module 185.

As seen in FIG. 4A, the two physical documents 401 and 402 are shown to be within close proximity of one another. Viewing zones 403 and 404 of physical documents 401 and 402, respectively, are shown to have an overlapping viewing zone (or viewing region) 407. Both documents 401 and 402 have overlapping augmentable regions 405 and 406, respectively, due to the close proximity of the documents 401 and 402. In the example of FIG. 4A, the device 101 is within the overlapping viewing zone 407 and is able to view augmentable regions 405 and 406 and retrieve respective virtual content in the manner described above with reference to FIG. 1C and FIG. 2. Without the zone modification step 310, visual clutter will be present between the two augmented regions 405 and 406.

FIG. 4B shows the view 410 of the documents 401 and 402 after the zone modification view step 310 is executed by the zone value modification module 183 for the documents 401 and 402. In the example of FIG. 4B, at step 310, the zone value modification module 183 has modified the zone values of the viewing zones 403 and 404 for the two printed documents 401 and 402, respectively. The modification of the zone values results in the overlapping region 407 being reduced in size so that the augmented regions 405 and 406 of the documents 401 and 402, respectively, are no longer overlapping in the view 410.

Figure 5:
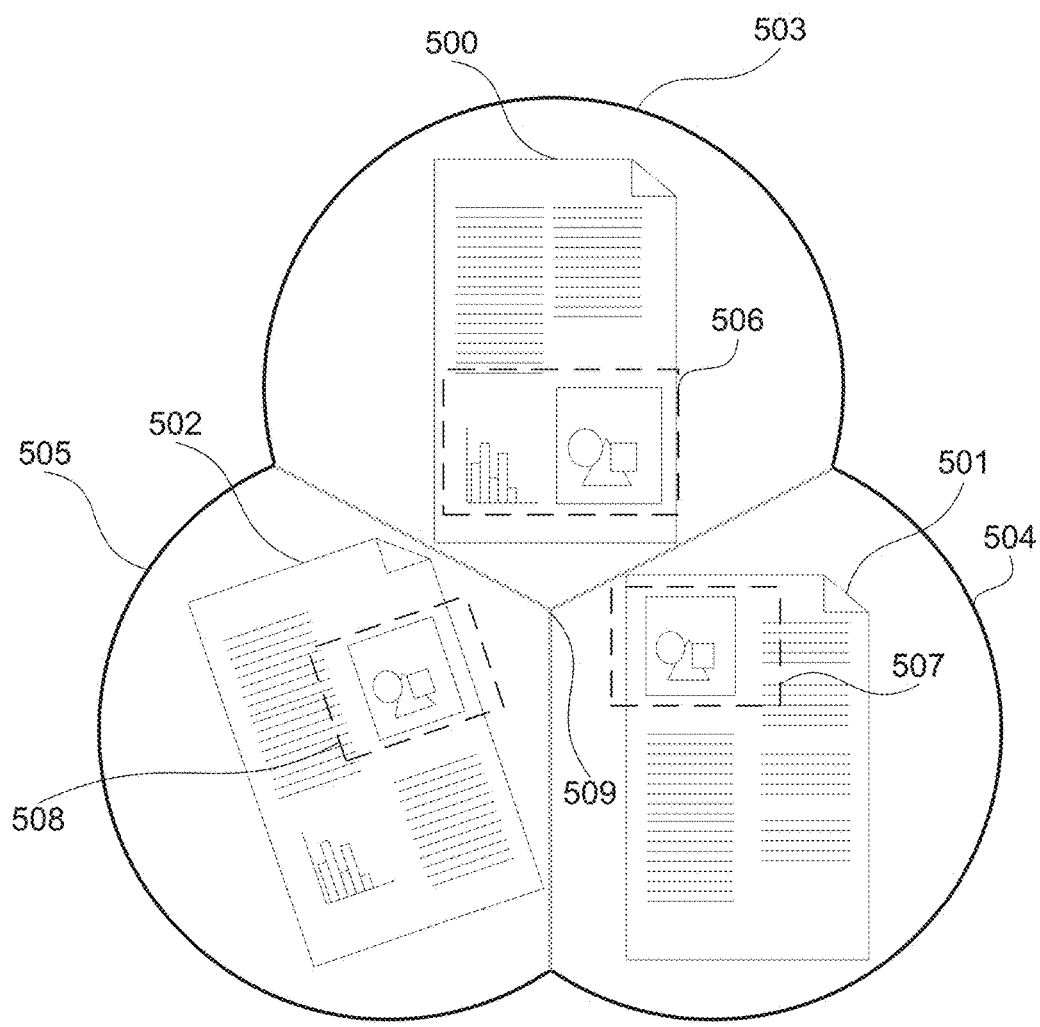
FIG. 5 shows three example viewing zones in close proximity.

FIG. 5 shows three example physical documents 500, 501 and 502. The physical documents 500, 501 and 502 may have been printed. The three documents 500, 501 and 502 are located within close proximity of one another (or adjacent to one another) and each document 500, 501 and 502 has an associated viewing zone 503, 504 and 505, respectively. Each document 500, 501 and 502 also has an augmentable region 506, 507 and 508, respectively. In the example of FIG. 5, each augmentable region 506, 507 and 508 is modified by the zone value modification module 183 under execution of the processor 105. In the example of FIG. 5, the device 101 is able to view the augmentable regions 506, 507 and 508 within their viewing zones 503, 504 and 505, respectively, in order to have augmented content retrieved and displayed on the device 101, using the method 200 described above.

Prior to modification of the zone values in the example of FIG. 5 each viewing zone (or document zone) 503, 504 and 505 has an overlapping region and overlapping virtual content 506, 507 and 508. Upon detecting the overlapping viewing zones (or viewing regions), the zone value modification module 183 modifies the zone values of the documents 500, 501 and 502 to reduce the overlap between viewing zones and virtual content in the manner described above with reference to the zone modification step 310.

As shown in the example of FIG. 5, each viewing zone value describes a three-dimensional volume defining a hemisphere around the corresponding document. In the example of FIG. 5, where three viewing zones (or viewing regions) are intersecting, the zone value modification module 183 modifies each zone value to divide up the zones into equal volumes. Other forms of zone distribution are also possible. After the zone values have been modified to reduce overlap, the zone value modification module 183 will reduce, if needed, the augmentable regions 506, 507 and 508 to ensure augmented content is contained with its respective zone.

Figure 6:
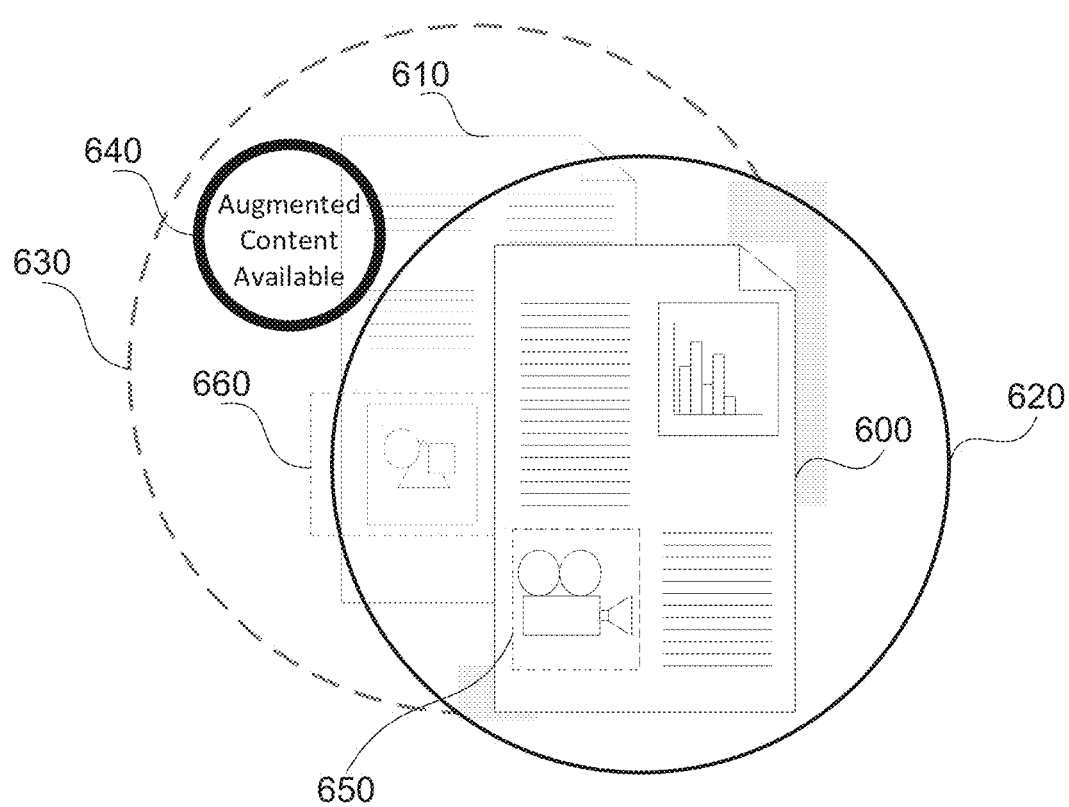
FIG. 6 shows two documents with associated viewing zones (or document zones) where one document is overlapping a second document.

In the example of FIG. 6, two physical documents 600 and 610 are positioned such that document 600 is partially covering document 610. Again, the physical documents 600 and 610 may be printed. In the example of FIG. 6, it is assumed that the device 101 is within one of the viewing zones 620 or 630, in order to have augmented content retrieved and displayed on the device 101 in the manner described above with reference to the method 200.

In the example of FIG. 6, the zone value modification module 183 determines that an overlap exists between viewing zones 620 and 630. As a result, the augmentable region 660 and content associated with the region 660 is suppressed and not rendered by the device renderer module 185. In place of the suppressed augmentable region and associated content, the augmented indicator 640 rendered by the device renderer module 185 to indicate to the user of the device 101 that augmented content is available within partially covered document 610. The virtual content within the augmentable region 650 of document 600 is rendered by the device renderer module 185.

When the user of the device 101 provides input, for example, by touching the augmented indicator 640 displayed on the display 114, augmentable region 650 and associated virtual content in the printed document 600 is suppressed and no longer rendered by the device renderer module 185. Other input types to the augmented indicator 640 are also possible. Once augmentable region 650 is suppressed from the device render module 650, augmentable region 660 and associated virtual content becomes available for rendering by the device renderer module 185.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of rendering virtual content on an augmented reality device in an augmented reality space containing a plurality of documents, the method comprising:
   retrieving a three-dimensional volume associated with each of a first document and a second document;
   modifying the three-dimensional volume associated with the first document in response to detecting overlap between the three-dimensional volume associated with the first document and the three-dimensional volume associated with the second document; and
   rendering virtual content associated with the first document in the three dimensional volume associated with the first document on the augmented reality device, at a time based on a pose estimation of the augmented reality device with respect to the first document, in response to detecting the augmented reality device being within bounds of the three-dimensional volume of the first document.

2. The method according to claim 1, wherein the three-dimensional volume associated with each of the first document and the second document is a three-dimensional zone around each of the first document and the second document respectively.

3. The method according to claim 1, wherein location of rendering virtual content relative to the first document is predetermined.

4. The method according to claim 1, wherein the three-dimensional volume associated with the first document and the second document is defined by an amount of virtual content associated with the first document and the second document respectively.

5. The method according to claim 1, wherein the pose estimation of the augmented reality device comprises estimating distance and orientation of the augmented reality device with respect to the first document.

6. A system for rendering virtual content on an augmented reality device in an augmented reality space containing a plurality of documents, the system comprising:
   a memory for storing data and a computer program;
   a processor coupled to the memory for executing the computer program, the program comprising instructions for:
   retrieving a three-dimensional volume associated with each of a first document and a second document;
   modifying the three-dimensional volume associated with the first document in response to detecting overlap between the three-dimensional volume associated with the first document and the three-dimensional volume associated with the second document; and
   rendering virtual content associated with the first document in the three dimensional volume associated with the first document on the augmented reality device, at a time based on a pose estimation of the augmented reality device with respect to the first document, in response to detecting the augmented reality device being within bounds of the three-dimensional volume of the first document.

7. An apparatus for rendering virtual content on an augmented reality device in an augmented reality space containing a plurality of documents, the apparatus comprising:
   means for retrieving a three-dimensional volume associated with each of a first document and a second document;
   means for modifying the three-dimensional volume associated with the first document in response to detecting overlap between the three-dimensional volume associated with the first document and the three-dimensional volume associated with the second document; and
   means for rendering virtual content associated with the first document in the three dimensional volume associated with the first document on the augmented reality device, at a time based on a pose estimation of the augmented reality device with respect to the first document, in response to detecting the augmented reality device being within bounds of the three-dimensional volume of the first document.

8. A non-transitory computer readable medium having a program stored on the medium for rendering virtual content on an augmented reality device in an augmented reality space containing a plurality of documents, the program comprising:
   code for retrieving a three-dimensional volume associated with each of a first document and a second document;
   code for modifying the three-dimensional volume associated with the first document in response to detecting overlap between the three-dimensional volume associated with the first document and the three-dimensional volume associated with the second document; and
   code for rendering virtual content associated with the first document in the three dimensional volume associated with the first document on the augmented reality device, at a time based on a pose estimation of the augmented reality device with respect to the first document, in response to detecting the augmented reality device being within bounds of the three-dimensional volume of the first document.

* * * * *